March 15, 1960     D. C. DURGIN     2,928,517
CARRIAGE SHIFT FOR BUSINESS MACHINES
Filed Oct. 10, 1958     6 Sheets-Sheet 1

INVENTOR.
DOUGLAS C. DURGIN
BY
AGENT

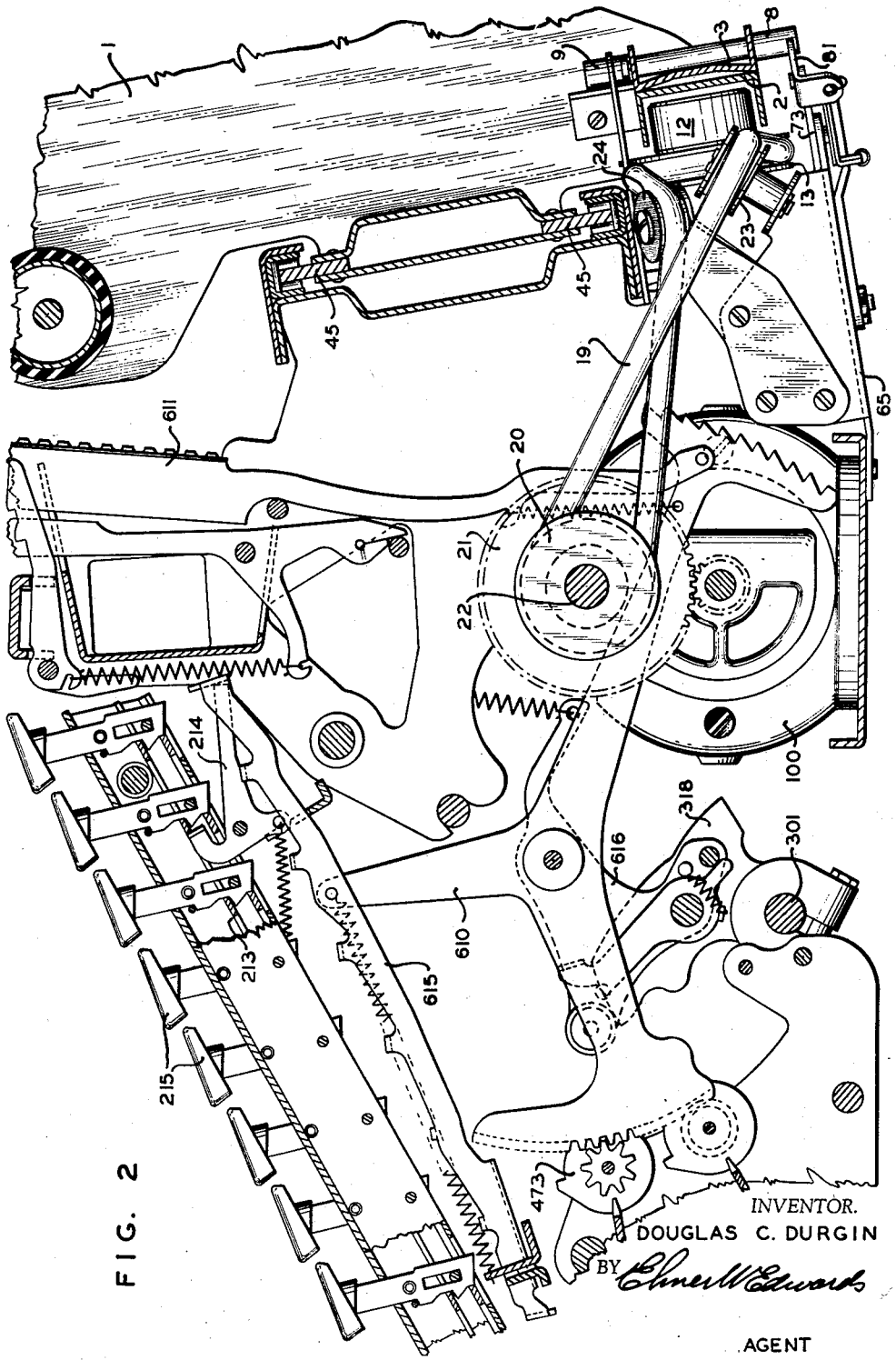

March 15, 1960 D. C. DURGIN 2,928,517
CARRIAGE SHIFT FOR BUSINESS MACHINES
Filed Oct. 10, 1958 6 Sheets-Sheet 3
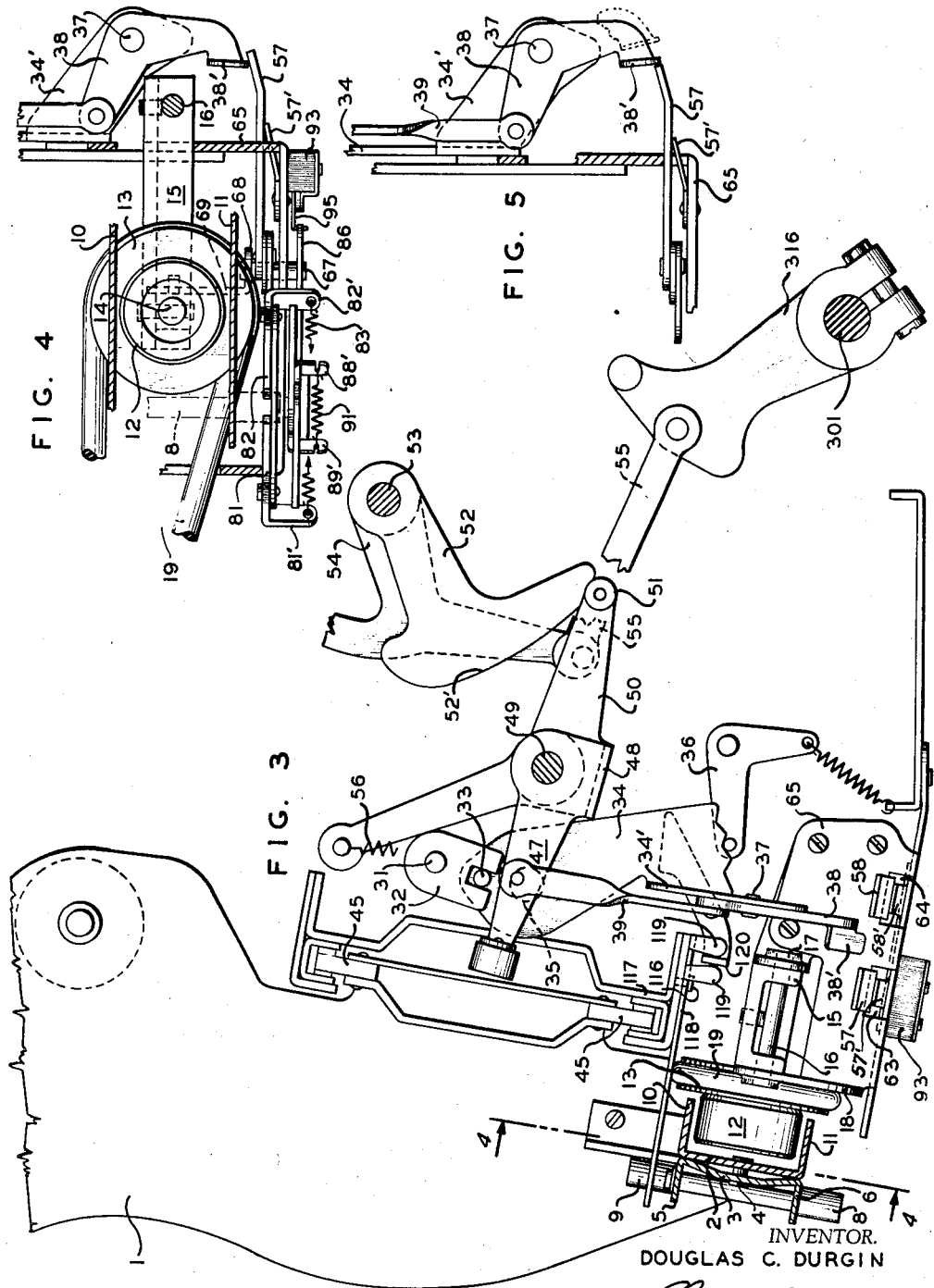
INVENTOR.
DOUGLAS C. DURGIN
BY
AGENT March 15, 1960 D. C. DURGIN 2,928,517
CARRIAGE SHIFT FOR BUSINESS MACHINES
Filed Oct. 10, 1958 6 Sheets-Sheet 4

INVENTOR.
DOUGLAS C. DURGIN
BY *Elmer W. Edwards*
AGENT

March 15, 1960  D. C. DURGIN  2,928,517
CARRIAGE SHIFT FOR BUSINESS MACHINES
Filed Oct. 10, 1958  6 Sheets-Sheet 5

INVENTOR.
DOUGLAS C. DURGIN
BY Elmer M Edwards
AGENT

March 15, 1960 D. C. DURGIN 2,928,517
CARRIAGE SHIFT FOR BUSINESS MACHINES
Filed Oct. 10, 1958 6 Sheets-Sheet 6

INVENTOR.
DOUGLAS C. DURGIN
BY
AGENT

United States Patent Office 2,928,517
Patented Mar. 15, 1960

2,928,517

CARRIAGE SHIFT FOR BUSINESS MACHINES

Douglas C. Durgin, West Orange, N.J., assignor to Monroe Calculating Machine Company, Orange, N.J., a corporation of Delaware Application October 10, 1958, Serial No. 766,530

10 Claims. (Cl. 197—177)

The invention relates to means for selectively controlling shifting and nonshifting operations of the record carriage for business machines, such as a lister calculator or the like, and more particularly to novel power devices employing a friction drive means which is adjustable for effecting a selective frictional engagement with the carriage whereby to cause a displacement of the carriage for right and left shifting operations.

One object of the invention is to provide carriage shift devices including a nonreversible power drive train which is adapted to the purpose of selectively tabulating the carriage in a right or left shift operation.

Another object of the invention is to provide a power carriage shift train including a unidirectionally operated friction drive element selectively displaceable for frictional drive engagement with selective shift control tracks on the carriage or for nonengagement therewith, whereby to selectively effect a rightward, leftward or nonshifting operation of the carriage.

Another object of the invention is the provision of selectively operable manual control devices including a control member presettable to selective ones of a plurality of positions whereby to predetermine a left shift, right shift or nonshift operation control of said friction drive element.

A further object of the invention provides for means operable in a cyclic operation of the machine to adjust the said friction drive element automatically in accordance with a setting of said control member by the manual control devices, whereby to determine a nontabulating operation or to effect an automatic tabulating operation of the carriage in a preselected direction as incident to the machine operations.

Special means are also provided whereby to terminate a carriage shift automatically in any adjacent tabulating positions thereof.

Special means for automatically setting the shift control devices to a reverse shift control position when the carriage reaches either one of the extreme terminal shift positions of its movement is also provided.

With the above and other objects in view the nature of which will appear as the description proceeds the invention resides in the novel construction, combination and arrangement of parts as hereinafter described with reference to the accompanying drawings and more particularly defined by the appended claims.

In the drawings:

Fig. 2 is a cross sectional elevation taken substantially through the middle of the machine and showing the digit keys, printing means and the platen carriage shifting means.

Fig. 3 is a left side elevation of the platen carriage and portions of the shifting means therefor.

Fig. 4 is a detail elevation of control means for the shifting devices, as viewed along line 4—4 of Fig. 3.

Fig. 5 is a fragmentary view showing certain of the devices of Fig. 4 in a partially operated position.

Figure 1:
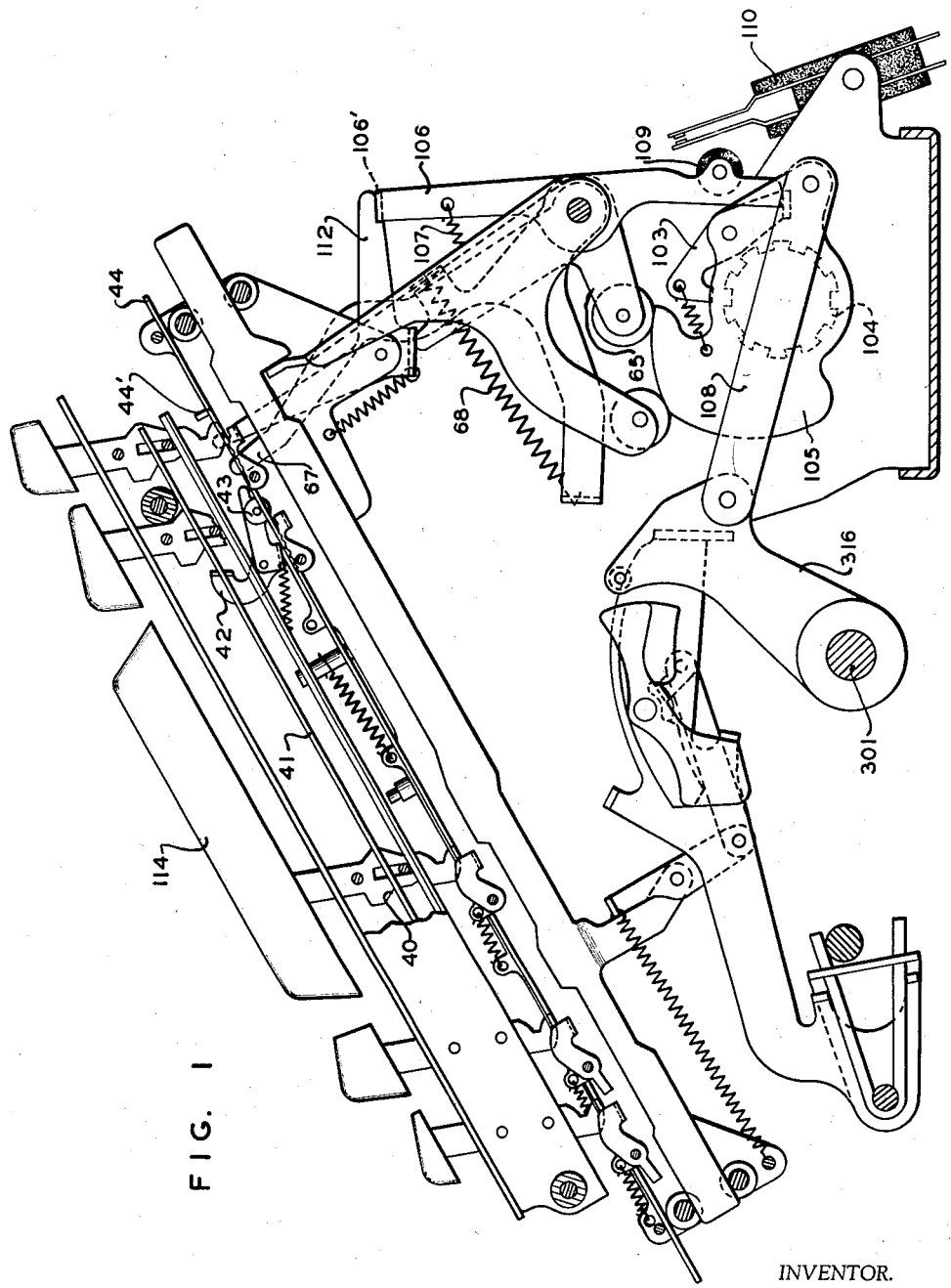
Fig. 1 is a right side elevation taken just inside the framing and showing the machine cycle clutch and controls therefor.

The invention, for convenience, is shown as applied to a listing calculator such as that disclosed in U.S. Patents No. 2,323,205, dated June 29, 1943 and No. 2,330,689, dated September 28, 1943, both issued to Loring P. Crosman.

As more fully set forth in the above reference patents amounts set up on the digit keys 215 (Fig. 2) are transferred to suitable accumulator wheels 473 upon operation of the machine, by means of a series of differential actuators 610. These differential actuators are spring operated, and are normally restrained by frame 616. Actuators 610 are formed as three armed levers, the forward arms thereof having segmental gear teeth for rotating the accumulator wheels; the upper arms being pivotally connected each with a digit index bar 615, and the rearward arms being pivotally connected each with a type bar 611 of the printing mechanism. The actuators are normally held under restraint of a series of zero latches 214, each zero latch being releasable upon depression of any key 215 in the same column by means of a slide 213. Upon operation of the machine, and movement of frame 616, the released actuators will be rotated counterclockwise until stopped by contact of a lug of the related index bar 615 with the stem of the depressed key, thereby registering the value of said key in the related accumulator wheel and setting the type bar 611 into position to print the digit.

Motor operation of the machine is initiated, as in the manner set forth in the U.S. Patent No. 2,330,689, by imparting a rocking movement to a clutch control lever 106 (Fig. 1), said lever being provided with an insulation roller 109 operable to close the contacts of a switch 110 interposed in the circuit for the electric motor 100 (Fig. 2). Rocking movement of lever 106 will also move the bottom end of said lever out of contact with a spring actuated pawl 103, mounted upon a plate 105 and forming the driven member of a clutch. Upon release, pawl 103 will be moved into contact with the driving member 104 of the clutch, having direct driving connection with the motor 100.

Release of clutch lever 106 is effected by the depression of a motor key 114 the stem of which is provided with a cam surface 40, acting in the depression of the key to move a slide 41 forwardly, thereby operating a bell crank lever 42 having a roller 43 engaging a notch formed in a spring operated slide 44. Slide 44 is provided with a lug 44', which, upon depression of key 114 and operation of slide 44, will engage with the upper arm of a pivoted latch 112 to rock said latch free of engagement with a lug 106' of the lever 106. Upon release of latch 112 from lug 106' lever 106 under influence of suitable spring means 107 is rocked counterclockwise for engaging the clutch means 103—104 above described and thereby effect motor operation of the machine.

Pawl 103, mounted upon the plate 105, will cause said plate to be rotated counterclockwise upon engagement of said pawl with the drive member 104. Plate 105 is connected by a link 108 with a lever 316, fulcrumed upon shaft 301, rotation of the plate serving to reciprocate said lever, the shaft 301, and a cam 318 (Fig. 2), which operates to effect reciprocatory movement of frame 616 for operating the actuators 610, in well-known manner.

Near the end of the cycle of operation of the machine a cam edge of plate 105 acts to rock a bell crank lever 65 in clockwise direction and said lever will engage and rock also the lever 106 for bringing the lower end thereof into position for reengagement with the moving pawl 103, whereby to effect disengagement of said pawl from the driving member 104. At the same time yieldable spring connection 68 between bell crank 65 and a forward arm of a lever 67 rocks said lever 67 clockwise to restore operating slide 44 rearwardly and to reengage latch 112 with lug 106' of lever 106.

The platen carriage 1 (Fig. 2) includes upper and lower spaced rails 45, whereby the carriage will ride upon suitable antifriction rollers in the manner set forth in U.S. Patent No. 2,323,205.

*Frictional carriage shift means*

Figure 11:
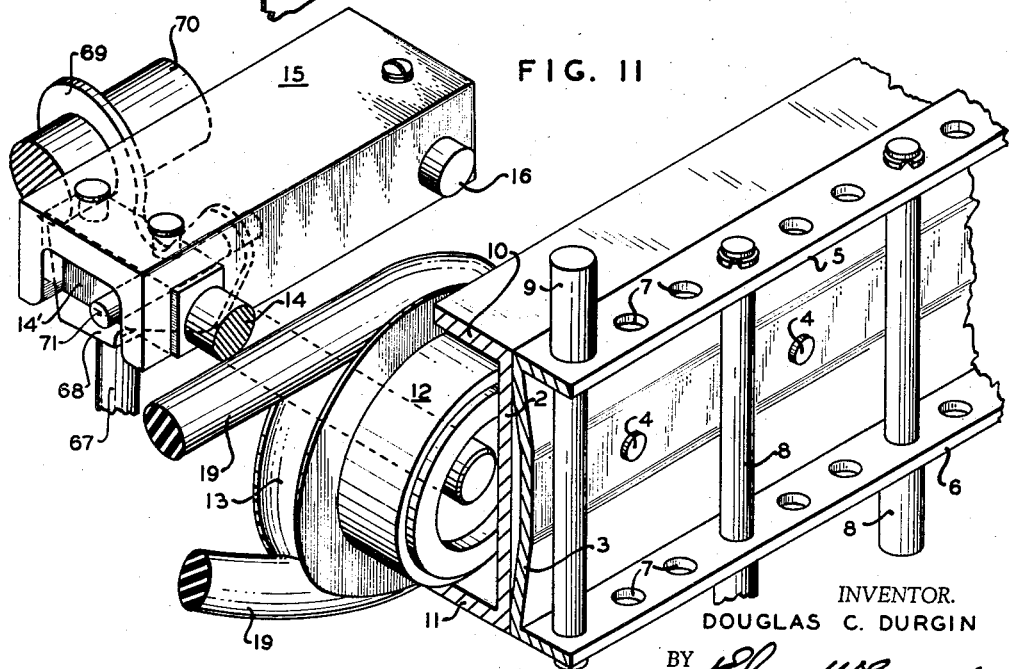
Fig. 11 is a perspective, viewed from the left rear of the machine, and showing the friction drive elements for shifting the carriage.

Secured within the right and left end framing of the carriage is a strut member formed by placing back to back a pair of U-shaped channel bars 2, 3 (Figs. 3, 11), secured together by means of spaced rivets 4. The rearwardly extending upper and lower flanges 5, 6 of the bar 3 include a plurality of orifices spaced opposed so that there may be inserted therein at random a plurality of stop pins 8 each projecting downwardly beneath the lower flange 6 and a pair of similar pins 9 each projecting upwardly from the flange 5. Pins 8 are for the purpose of stopping and securing the platen carriage at successive columnar positions and pins 9, one at each end of the bar 3, are adapted to the purpose of effecting an automatic control for reversing the direction of shifting movement of the carriage, as hereinafter to be described.

The forward facing upper and lower flanges 10, 11 of the bar 2 are sufficiently apart so as to provide a clearance space between the diameter of a cooperating roller 12 and said spaced flanges. Roller 12 is composed of any suitable resilient material, such as rubber, and, if desired for longer wear, may be capped with a harder material providing a suitable coefficient of friction with the flanges 10, 11 of bar 2 whereby to effect shifting movements of the carriage.

Roller 12 is mounted fast with the hub of a pulley wheel 13, loosely mounted upon a stub shaft 14 having a squared end portion 14' secured within a rock arm 15. Rock arm 15 is supported by means of trunnions 16 for an upward and downward movement, said trunnions being bearinged within suitable end brackets 17, 18, as shown in Fig. 3. Pulley 13 has drive belt connection 19 with a drive pulley wheel 20 (Fig. 2) fast to a gear 21 loosely mounted upon a stub shaft 22, secured to the inside face of the right side frame of the machine. Suitable ball bearing guide rollers 23, 24 serve to effect the proper directional movement to drive belt 19 so as to cause rotational movement of the pulley 13 in a plane perpendicular to the plane of the drive pulley wheel 20.

In the contemplated mode of operation the carriage after a machine cycle of operation is adapted to remain in any given position or will be automatically tabulated toward the right or toward the left as determined in accordance with a preselected setting of suitable manual control keys to a right, left or non-shift control position, as in the following manner.

Figure 10:
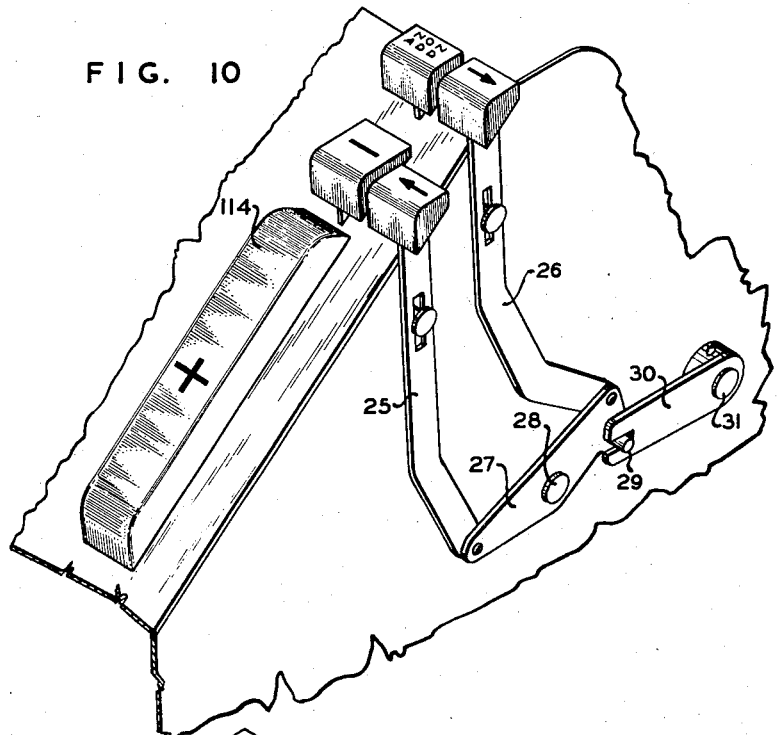
Fig. 10 is a right side perspective, showing the manual control means selectively settable for predetermining right, left or nonshift control operations of the carriage.

Left shift key 25 (Fig. 10) and right shift key 26 are each pivotally mounted to the opposite ends of a lever 27 intermediately fulcrumed at 28 to the right-hand side framing of the machine. Said lever has pin and open end slot connection 29 with an arm 30 fast to a transverse shaft 31. The opposite end of shaft 31 has fast thereon a downwardly extending arm 32 (Fig. 3) having open end slot connection with a pin 33 fast to the upper end of a locator lever 34, pivoted to the machine framing at 35. The lower edge of lever 34 has a serrated edge cooperable with a spring click 36 whereby said lever and thereby shaft 31 and the keys 25, 26 are held in their set control positions.

Figure 6:
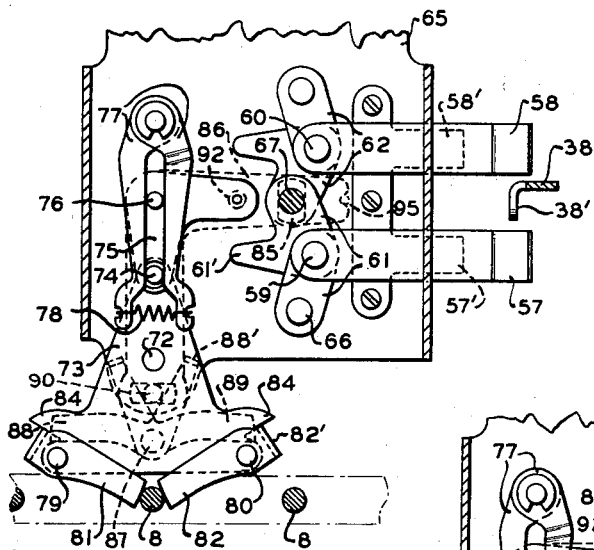
Fig. 6 is a plan view of substantially the same parts shown in Fig. 4, and being in the carriage nonshift control position.

Pivotally mounted at 37 (Figs. 4, 5) to a lateral projection 34' of locator lever 34 is a bell crank lever 38 having link connection 39 with a rearwardly extending arm 47 (Fig. 3) of a rock frame 48 loosely mounted upon a transverse shaft 49 of the machine. A forwardly extending arm 50 of frame 48 has a roller 51 engaging a cam surface 52' of a lever 52 fast to a shaft 53 to which is also secured a lever 54 having link connection 55 with the rock lever 316 operated by the cyclic clutch 103—104, earlier described in relation to Fig. 1. In the forward operation of lever 316 during a machine cycle of operation cam 52 rotates counterclockwise and the cam surface 52' falls away from roller 51, so that frame 48, under influence of a suitable spring 56 connected to an upper arm thereof, is rocked counterclockwise. Upon said counterclockwise movement of frame 48 link 39 is moved downwardly and will impart a counterclockwise operation (Figs. 4, 5) to the bell crank lever 38. The lower end of bell crank 38 has a laterally extending projection 38' which in the intermediate or nonshift setting of the right, left shift keys 25, 26 is positioned centrally so as to be out of cooperation with each one of a pair of slide members 57, 58 respectively, as shown in Figs. 3 and 6. Each of the said slide members at one end has pivotal connection 59, 60 respectively to a related toggle means 61, 62. The free ends of said slides extend through enlarged guide slots 63, 64 (Fig. 3) in a support bracket 65 and a related leaf spring 57', 58' will act to hold the respective slides upwardly in said slots.

Upon a depression of either left shift key 25 or right shift key 26 (Fig. 10) the opposite key moves upwardly, and lever 27 by means of pin 29 and arm 30 effects a corresponding rocking movement to the shaft 31 as in accordance with the depressed key. Rocking movement of shaft 31 will, by means of arm 32 (Fig. 3), act to rock the locator lever 34, so that the projection 38' of bell crank 38 is displaced therewith to be selectively positioned above the free end of either lever 57 or of lever 58 according to the depression of shift control key 25 or 26.

Since rightward shifting operations will be readily understood from the description hereinafter set forth with relation to a leftward shift operation, only the latter will be described in detail. It will be understood however that devices operable in similar manner to those described for a leftward shift are provided also to effect rightward shifting operations.

Upon any subsequent operation of the cyclic means bell crank lever 38 (Fig. 4) is first moved counterclockwise, as above described, and projection 38' thereof is moved from the normal condition of rest shown in Fig. 4 to the dotted line position as illustrated in Fig. 5. During said operation projection 38' engages the upturned end of the active slide 57 and depresses said slide downwardly, against the pressure of the related leaf spring 57', and thereafter releases said slide which thereupon snaps upwardly to be positioned in front of a return stroke movement of the said projection 38', as shown in Fig. 5. Upon a return movement of bell crank 38, the left shift control key 25 being depressed, projection 38' engages the end surface of slide 57 and imparts a leftward movement (Figs. 4 to 8) thereto; and it will be noted that during said movement projection 38' moves upwardly in an arc about pivot center 37 and so will immediately thereafter trip free of said slide. A leftward movement of slide 57 will act to displace the toggle means 61 and so adjust certain means controlled thereby from their normal nonactive shift control position, illustrated in Fig. 6, and, passing through an intermediate control position illustrated by Fig. 7, to the left shift control position illustrated in Fig. 8, as will now be described.

Figure 8:
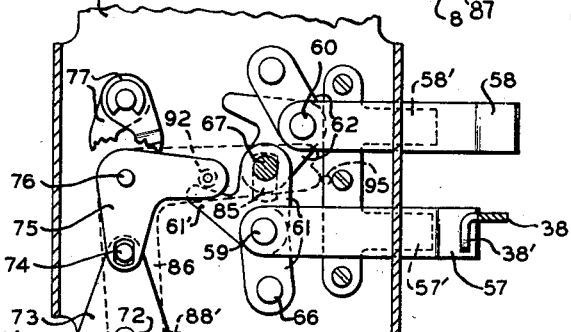
Fig. 8 is a similar view, with the parts shown in a completely set position relative to effecting a leftward carriage shift operation.

One end of toggle 61 is pivoted at 66 to the fixed frame 65 and the other end of said toggle has pivotal connection with a stud 67 secured to extend downwardly from a lug 68 (Figs. 9, 11) on the lower arm of a bell crank lever 69, loosely mounted upon a transverse shaft 70. The upper arm of bell crank 69 is provided with an aperture embracing a pin 71 of smaller diameter thereto and which pin is fast within the squared end portion 14' of the shaft 14 secured within the rock arm 15 for the friction drive roller 12, earlier described. Upon a displacement of slide 57 by the bell crank 38, above set forth, toggle 61 is moved from the collapsed position, illustrated in Fig. 6, to the extended position just slightly over center, as shown in Fig. 8, and will act thereby to displace the stud 67 so as to rock bell crank lever 69 in a clockwise direction, as viewed in Figs. 9 and 11. Upon clockwise operation bell crank 69 through the loose connection pin 71 imparts a downward movement upon trunnions 16 to the rock lever 15 and said lever will carry the rotating friction drive roller 12 downwardly therewith and into engagement with the lower flange 11 of the bar 2, whereby a frictional bias in a left shift direction is effected to the record carriage.

Figure 9:
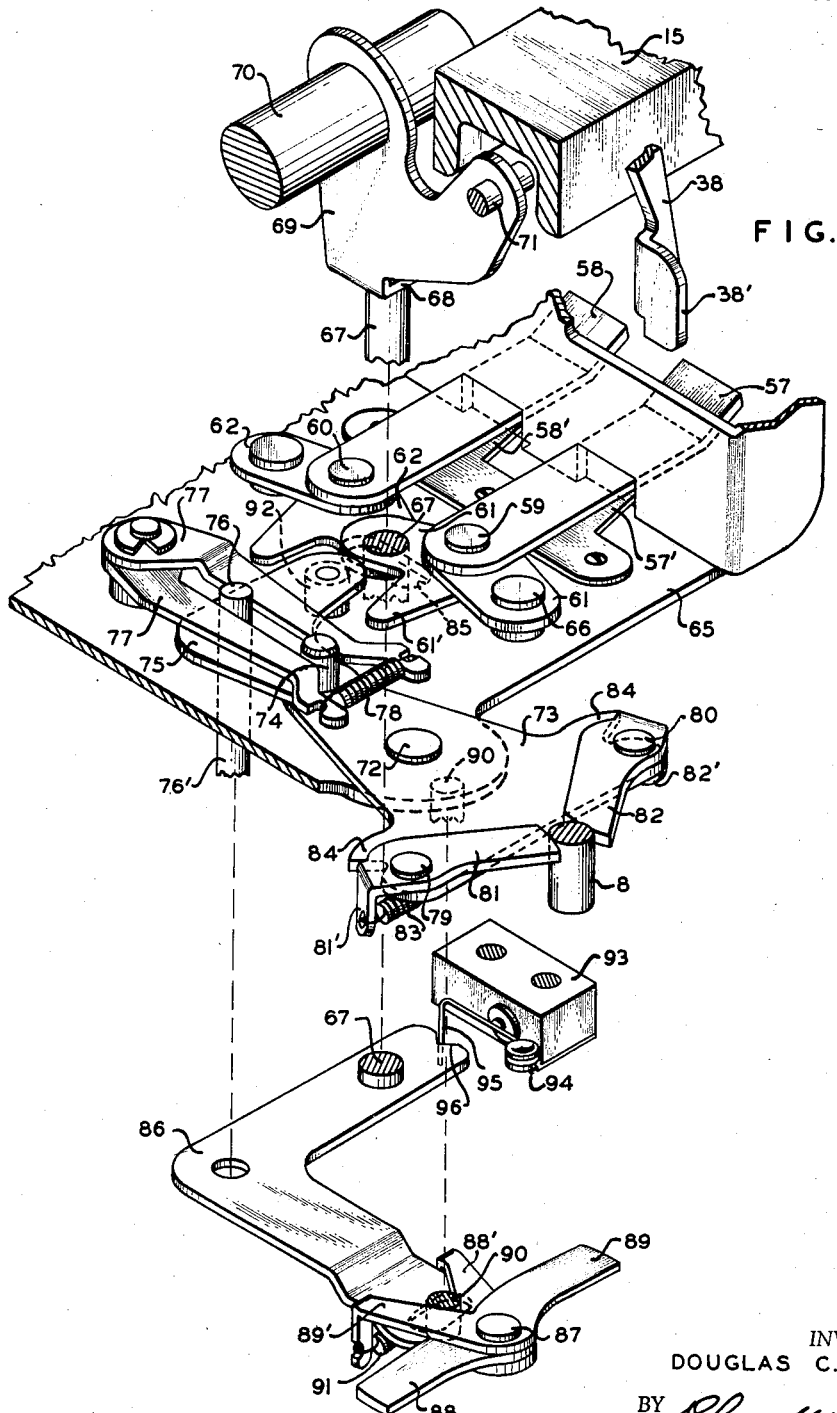
Fig. 9 is an exploded perspective view of the parts shown in Fig. 6.

It is recalled that the flanged bar 3 of the carriage has mounted thereon a series of carriage locating stop pins 8 and that said pins are adapted for cooperation with a special carriage release and cushion stop means, as will now be described in detail with particular reference to Fig. 9.

Pivotally mounted at 72 to the upper surface of support plate 65 is a lever 73 having fast thereon a pin 74 which extends upwardly through a suitable orifice in one arm of a bell crank lever 75 pivotally mounted upon a stud 76 fast upon the said frame 65. Also pivotally mounted upon said plate 65 is a pair of scissor type locator arms 77 adapted, under influence of spring 78, for urging said bell crank and the lever 73 in a centralized position, as shown. Pivoted respectively at 79, 80 upon lever 73 is a pair of yieldable pawls 81, 82 each one held by means of an interconnecting spring member 83 against suitable related stop ears 84 of the lever 73 so that the opposed ends of the said pawls are adapted for effecting an engagement with successive ones of the said pins 8, whereby to cushion any carriage shift stop movement from either direction and to locate the carriage in set position.

Stud 67, operable by the toggle means 61, 62 as in the manner above set forth, extends downwardly to pass through a suitable guide slot 85 (Fig. 6) in support plate 65 and to effect a pivotal connection with one arm of a bell crank lever 86, pivotally supported to the underside of plate 65 by a shouldered extension 76' (Fig. 9) of the pivot stud 76. The other arm of bell crank 86 has pivotally mounted at 87 thereon a pair of trip pawls 88, 89 each one, in the normal position of the parts shown in Fig. 6, being adapted for engagement with a lateral lug 81', 82' on the corresponding locator pawls 81, 82. The trip pawls 88, 89 each have an arm 88', 89' respectively, adapted for engagement with the opposite side of a stud 90, fast to the underside of plate 65. A suitable spring means 91, connected between the arms 88', 89' acts to bias said pawls in opposite directions, as limited by engagement of each of the said arms with the opposite edges of the bell crank lever 86.

Figure 7:
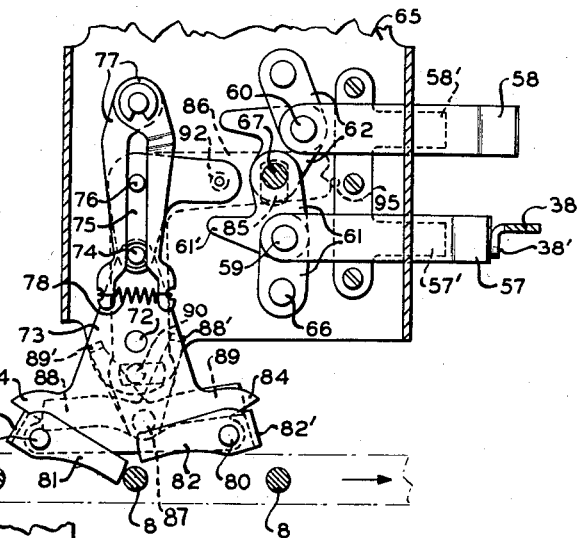
Fig. 7 is a similar view, with the parts shown in a partially operated position relative to effecting a leftward carriage shift operation.

During the displacement of stud 67 by the above described operation of the toggle means 61 said stud will impart a counterclockwise movement to the bell crank lever 86 and the trip pawl 89 carried thereon engages lug 82' of the locator pawl 82, rocking said pawl to the position illustrated in Fig. 7, wherein the said pawl has now been released from engagement with the carriage pin 8. Upon such release of locator pawl 82 from a pin 8 the carriage will immediately shift toward the left, by means of the above described friction bias effected by the engagement of the rotating roller 12 with the flange 11. It will be noted however, with reference to Fig. 7, that toggle means 61 is not as yet adjusted to its fully set position. As the said toggle completes a movement to fully adjusted position stud 67 imparts a further movement to the bell crank lever 86. During the latter movement of bell crank 86 the engagement of arm 89' of trip pawl 89 with the stud 90 will cause said trip pawl to be rocked about point 87 to the position as illustrated in Fig. 8, wherein trip pawl 89 has now released locator pawl 82 in time to permit an engagement thereof with a succeeding one of the pins 8 during the carriage shifting operation. As pin 8 moves into engagement with pawl 82 during a carriage shift operation said pin will effect a counterclockwise movement to the lever 73 and, by means of pin 74, impart a clockwise movement to the bell crank lever 75 upon which said pin is secured, as earlier set forth. Secured to the underside of bell crank lever 75 is a pin 92 adapted during said operation of bell crank 75 to engage a tooth 61' of the toggle means 61 and to thereby restore the said toggle means to the normal nonshift position of Fig. 6.

Operation of pin 74 has also acted to effect an operation of the spring cushion stop means 77, which means in addition to cushioning a stopping of the carriage movement will subsequently, under influence of the tensioned spring 78, act to restore the parts to their normal centralized position shown in Fig. 6.

It will be recalled that a release of the clutch means 103—104, shown in Fig. 1, will effect also a closure of the contact switch means 110 for effecting an operation of the motor 100 and that at the end of the machine cycle of operation clutch control lever 106 is restored and will reopen the said switch. It may occur therefore that switch 110 will be opened prior to the completion of a carriage shift operation. So that motor 100 may continue in operation until a carriage shift operation has been completed a snap switch 93 is connected in parallel circuit to the motor 100. Pivoted at 94 to said switch is an arm 95 engaging a notched surface 96 of the bell crank lever 86. Thus any displacement of said bell crank by an operation of either toggle means 61 or 62 in effecting a right or left shift operation will cause a closure of the contacts of said switch and said contacts will remain closed until reopened by a restoral of the bell crank 86 in terminating a carriage shift operation, as in the manner above set forth.

Means whereby the carriage may be shuttled automatically between selective positions are provided as follows:

It will be recalled that a pair of pins 9 project upwardly from the flanged bar 3 and that said pins are adapted for placement at random each within selective ones of the holes 7. Pivotally mounted at 116 (Fig. 3) to the carriage support frame 117 is a bell crank lever 118 the leftwardly extending arm of which is provided with a pair of downwardly extending lugs 119. Lugs 119 embrace a lug 120 on the locator lever 34, which it is recalled controls a setting of projection 38' in selectively determining carriage shifting operations, as in the manner previously described. The rearward arm of bell crank lever 118 extends into the path of movement of the pins 9. Thus during a leftward shift of the carriage a pin 9 set to the right of said arm of bell crank 118 will act to impart a counterclockwise operation to the bell crank and thereby also a counterclockwise operation to the locator lever 34. Counterclockwise operation of lever 34 will act to displace projection 38' from the left shift control position opposite slide 57 to the right shift control position opposite slide 58. Thus following a subsequent machine cycle of operation the carriage will now automatically shift rightward and will continue in rightward shift operations, unless otherwise modified by operation of the manual control keys 25, 26, until a pin 9 placed to the left of said arm of bell crank lever 113 acts to engage said arm and readjust the parts again to the opposite shift condition.

While there have been shown and described and pointed out the fundamental novel features of the invention as applied to a preferred embodiment thereof it will be understood that various omissions and substitutions and changes in the form and details of the devices illustrated and in their operations may be made by those skilled in the art, without departing from the spirit as indicated by the scope of the claims appended hereto.

What I claim is:

1. In a business machine of the class described the combination of cyclic operating means, a motor, drive means between said motor and said cyclic operating means including a clutch, a transversely shiftable record carriage; shifting means for said carriage including a drive train operable by said motor independently of the said clutch, a pair of spaced continual surfaces on said carriage, a frictional drive element in the carriage drive train cooperable selectively with one or the other of said spaced surfaces, a pivoted support member for said frictional drive element, means for controlling said clutch to initiate operation of said cyclic operating means, and means operable in an operation of the cyclic operating means to automatically rock said pivoted support member for engaging said frictional drive element with a predetermined one of said spaced surfaces and thereby frictionally shift the carriage in a preselected direction.

2. In a machine of the class described the combination having cyclic operating means, a motor, drive means for said cyclic operating means including a clutch, manual control means for releasing said clutch to effect operation of the cyclic operating means, a shiftable record carriage; shifting means for said carriage including a drive train unidirectionally driven by said motor independently of said clutch, spaced friction drive surfaces on said carriage related each to a direction of shift, a friction drive element in said carriage train and having a pivoted support member therefor, manual control devices including a control member presettable to a plurality of positions whereby to selectively determine operations of the said support member, and means operable upon an operation of the said cyclic operating means for effecting an operation of said control member, wherein said control member rocks the said pivoted member to engage the friction drive element thereon with a preselected one of the friction drive surfaces on the carriage as determined by a presetting of said control member for shifting said carriage in a predetermined direction.

3. Carriage shifting means for business machines comprising a track fast within the shiftable carriage and having at least two rails each with continual friction surfaces extending coincident to an extent of movement of said carriage, a rotating friction element adapted for selective engagement with said friction rails, a rock member normally supporting said rotating element out of cooperation with said rails, power means, a selectively settable member operable by said power means for displacing said rock member whereby to engage the said rotating friction element thereon with one or the other of said rails, and manual control means for presetting said member to selective control positions for determining a selective operation of said rock member wherein to frictionally engage said rotating friction element with a predetermined one of said rails and thereby to shift the carriage in a predetermined direction.

4. The invention according to claim 3 and including a first toggle means selectively operable in a power operation of the said settable member, whereby to displace the said rock member and to lock said rock member in displaced condition for holding the said friction element in engagement with a selected one of said rails for shifting the carriage in a given direction.

5. The invention according to claim 4 and including a second toggle means selectively operable in a power operation of the said settable member, whereby to displace the said rock member in an opposite direction to an operation thereof by the said first toggle means and being adapted to lock the rock member for holding the said friction element in engagement with the other of said rails and adapted for shifting the carriage in an opposite direction to the direction shifted under control of the first said toggle means.

6. The invention according to claim 5 and having carriage locating means including a plurality of selectively spaced pins on said carriage, a rock lever having pivoted thereon a pair of carriage holding pawls the opposed free ends of which are adapted for engaging opposite sides of said pins, a spring centralizer for said rock lever, a pair of triggers adapted each for effecting a momentary tripping operation to a related one of said pawls, and a pivoted support member for said triggers adapted to be oppositely rocked by selected operations of the selective toggle means, and wherein said triggers will selectively displace one or the other of said holding pawls from engagement with a carriage pin and thereby release the carriage for shifting operation in a preselected direction.

7. The invention according to claim 6 and wherein a shifting movement of the carriage effects an engagement of a subsequent one of said spaced carriage pins with the said carriage holding pawls and will effect an operation thereof and thereby an operation of the said spring centralizer for cushioning a stopping of the carriage, and wherein operation of said carriage holding pawls will act to restore the active one of the said toggle means and thereby also to restore the friction drive element to normal condition out of engagement with the friction drive surfaces on the carriage and thereby to automatically terminate a carriage shifting operation.

8. The invention according to claim 7 and including a control pin adapted to be selectively positioned upon the carriage, means operable by said pin in a final terminal movement of the carriage and adapted to automatically adjust a setting of the selectively settable member to a reverse control position thereof relative to causing a subsequent displacement thereby of the said friction drive means, and wherein a subsequent displacement of the friction drive means thereupon will reverse the carriage shift movement.

9. The invention according to claim 3 and having means for automatically reversing a carriage shift control when the carriage reaches any one of selectively predetermined final terminal shift positions of its movement, including a pair of control pins adapted to be selectively spaced upon the carriage, means operable by an active one of said pins in a final terminal movement of the carriage for automatically adjusting the selectively settable member to an opposite control position to a first setting thereof, and wherein a subsequent power operation of said settable member will displace the friction drive means to a reverse setting to the previous setting thereof and thereby cause a carriage shifting operation in the opposite direction.

10. The invention according to claim 2 and having a first control switch in the circuit for said motor, and wherein operation of said clutch release means effects a closure of said switch for causing an operation of said motor, and wherein said cyclic means is adapted to automatically restore said clutch and reopen the said switch, a second switch in parallel circuit with said motor, and means operable by the said control member during said operation thereof by the cyclic devices for closing said second switch whereby to maintain the motor in operation, and means operable by the carriage for automatically restoring said control member to release the said second switch and thereby stop the motor.

References Cited in the file of this patent

UNITED STATES PATENTS

| | | |
|---|---|---|
| 656,085 | Blickensderfer | Aug. 14, 1900 |
| 1,968,201 | Hamann | July 31, 1934 |
| 2,158,066 | Evans | May 16, 1939 |

FOREIGN PATENTS

| | | |
|---|---|---|
| 3,215 | Great Britain | Feb. 9, 1910 |